(12) United States Patent  
Karabinis

(10) Patent No.: US 7,796,985 B2  
(45) Date of Patent: *Sep. 14, 2010

(54) SYSTEMS AND METHODS FOR PACKING/UNPACKING SATELLITE SERVICE LINKS TO/FROM SATELLITE FEEDER LINKS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,120

(22) Filed: Jun. 30, 2009

(65) Prior Publication Data

US 2009/0264120 A1    Oct. 22, 2009

Related U.S. Application Data

(63) Continuation of application No. 11/146,463, filed on Jun. 7, 2005, now Pat. No. 7,574,206, which is a continuation of application No. 10/328,062, filed on Dec. 23, 2002, now Pat. No. 6,937,857.

(60) Provisional application No. 60/383,688, filed on May 28, 2002.

(51) Int. Cl.  
*H04Q 7/20* (2006.01)

(52) U.S. Cl. ............ 455/428; 455/13.3; 455/429; 455/12.1

(58) Field of Classification Search ............ 455/428, 455/13.3, 429, 12.1, 13.2, 13.4, 427, 430, 455/426.1, 17; 370/319, 326, 431  
See application file for complete search history.

(56) References Cited

U.S. PATENT DOCUMENTS 4,901,307 A    2/1990    Gilhousen et al.

(Continued)

FOREIGN PATENT DOCUMENTS

EP    0 506 255 A2    9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—John Lee  
(74) *Attorney, Agent, or Firm*—Myers Bigel Sibley & Sajovec, P.A.

(57) ABSTRACT

Information content is nonidentically mapped between service link carriers and feeder link carriers at a cellular satellite. A reduced number of satellite feeder link carriers compared to the number of satellite service link carriers and/or a reduced total bandwidth of the satellite feeder link carriers compared to the satellite service link carriers thereby may be obtained.

6 Claims, 3 Drawing Sheets

U.S. PATENT DOCUMENTS

| | | |
|---|---|---|
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,613,193 A | 3/1997 | Ishikawa et al. |
| 5,619,525 A | 4/1997 | Wiedeman et al. |
| 5,631,898 A | 5/1997 | Dent |
| 5,638,374 A | 6/1997 | Heath |
| 5,724,345 A | 3/1998 | Guameri et al. |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,903,549 A | 5/1999 | Von der Embse et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,150,977 A | 11/2000 | Wilcoxson et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,229,986 B1 | 5/2001 | Wu et al. |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,301,476 B1 | 10/2001 | Monte et al. |
| 6,317,583 B1 | 11/2001 | Wolcott et al. |
| 6,324,405 B1 | 11/2001 | Young et al. |
| 6,339,707 B1 | 1/2002 | Wainfan et al. |
| 6,341,213 B1 | 1/2002 | Wu |
| 6,366,776 B1 | 4/2002 | Wright et al. |
| 6,377,561 B1 | 4/2002 | Black et al. |
| 6,418,147 B1 | 7/2002 | Wiedeman |
| 6,442,148 B1 | 8/2002 | Adams et al. |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,163,998 B2 | 1/2007 | Leon et al. |
| 7,174,127 B2 | 2/2007 | Otten et al. |
| 7,180,873 B1 * | 2/2007 | Monte et al. ................. 370/325 |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 2001/0045494 A1 * | 11/2001 | Higgins ................. 244/158 R |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0034422 A1 * | 2/2003 | Higgins ................. 244/158 R |
| 2003/0149986 A1 | 8/2003 | Mayfield et al. |
| 2003/0153267 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0192200 A1 | 9/2004 | Karabinis |
| 2004/0192293 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2004/0259497 A1 | 12/2004 | Dent |
| 2005/0026606 A1 | 2/2005 | Karabinis |
| 2005/0041619 A1 | 2/2005 | Karabinis et al. |
| 2005/0079816 A1 | 4/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |

| | | |
|---|---|---|
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |
| 2007/0072545 A1 | 3/2007 | Karabinis et al. |
| 2007/0087690 A1 | 4/2007 | Karabinis |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0149127 A1 | 6/2007 | Karabinis |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | WO 03/026142 A2 | 3/2003 |
| WO | WO 03/026142 A3 | 3/2003 |

OTHER PUBLICATIONS

Ayyagari et al., "A satellite-augmented cellular network concept", *Wireless Networks*, Vo. 4, 1998, pp. 189-198.

Supplementary European Search Report, EP Application No. 03 73 1543.9, Sep. 14, 2006.

Written Opinion, PCT/US03/17614, Apr. 9, 2004.

International Search Report, PCT/US03/17614, Aug. 19, 2003.

\* cited by examiner

SYSTEMS AND METHODS FOR PACKING/UNPACKING SATELLITE SERVICE LINKS TO/FROM SATELLITE FEEDER LINKS

CROSS-REFERENCE TO RELATED APPLICATIONS

This application is a continuation of U.S. application Ser. No. 11/146,463, filed Jun. 7, 2005, now U.S. Pat. No. 7,574, 206 entitled Systems and Methods for Reducing Satellite Feeder Link Bandwidth/Carriers in Cellular Satellite Systems, which itself is a continuation of application Ser. No. 10/328,062, filed Dec. 23, 2002, now U.S. Pat. No. 6,937,857 entitled Systems and Methods for Reducing Satellite Feeder Link Bandwidth/Carriers in Cellular Satellite, and claims the benefit of provisional Application No. 60/383,688, filed May 28, 2002, entitled Systems and Methods for Reducing Satellite Feeder Link Bandwidth in Satellite Cellular Systems, assigned to the assignee of the present application, the disclosures of which are hereby incorporated herein by reference in their entirety as if set forth fully herein.

FIELD OF THE INVENTION

This invention relates to wireless communications systems and methods, and more particularly to cellular satellite communications systems and methods.

BACKGROUND OF THE INVENTION

Satellite communications systems and methods are widely used for wireless communications of voice and/or data. Satellite communications systems and methods generally employ at least one space-based component, such as one or more satellites that are configured to wirelessly communicate with a plurality of wireless terminals.

A satellite communications system or method may utilize a single antenna beam covering an entire service area served by the system. Alternatively, in cellular satellite communications systems and methods, multiple beams are provided, each of which can serve distinct geographical areas in the overall service area, to collectively serve an overall satellite service area. Thus, a cellular architecture similar to that used in conventional terrestrial cellular radiotelephone systems and methods can be implemented in cellular satellite-based systems and methods. The satellite typically communicates with wireless terminals over a bidirectional communications pathway, with communication signals being communicated from the satellite to the wireless terminal over a downlink or forward link, and from the wireless terminal to the satellite over an uplink or return link. The downlink and uplink may be collectively referred to as service links.

The overall design and operation of cellular satellite systems and methods are well known to those having skill in the art, and need not be described further herein. Moreover, as used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver, for wireless voice and/or data communications.

Cellular satellite communications systems and methods may deploy hundreds of cells, each of which corresponds to one or more spot beams, over their satellite footprint corresponding to a service area. It will be understood that large numbers of cells may be generally desirable, since the frequency reuse and the capacity of a cellular satellite communications system or method may both increase in direct proportion to the number of cells. Moreover, for a given satellite footprint or service area, increasing the number of cells may also provide a higher gain per cell, which can increase the link robustness and improve the quality of service.

The uplink and downlink communications between the wireless terminals and the satellite may utilize one or more air interfaces, including proprietary air interfaces and/or conventional terrestrial cellular interfaces, such as Time Division Multiple Access (TDMA) and/or Code Division Multiple Access (CDMA) air interfaces. A single air interface may be used throughout the cellular satellite system. Alternatively, multiple air interfaces may be used for the satellite communications. See, for example, U.S. Pat. No. 6,052,560, issued Apr. 18, 2000, entitled Satellite System Utilizing a Plurality of Air Interface Standards and Method Employing the Same, by the present inventor Karabinis. In general, regardless of the air interface or interfaces that are used, each satellite cell generally uses at least one carrier to provide service. Thus, the return service link and the forward service link each uses one or more carriers to provide service.

The above description has focused on communications between the satellite and the wireless terminals. However, cellular satellite communications systems and methods also generally employ a bidirectional feeder link for communications between a terrestrial satellite gateway and the satellite. The bidirectional feeder link includes a forward feeder link from the gateway to the satellite and a return feeder link from the satellite to the gateway. The forward feeder link and the return feeder link each uses one or more carriers.

As is well known to those having skill in the art, the number of satellite cells and the air interface or interfaces that are used may impact the bandwidth that is used in the feeder link from the satellite gateway to the satellite and from the satellite to the satellite gateway. For example, if a cellular satellite system and method deploys 400 cells and uses a narrowband CDMA air interface to provide communications between the satellite and the wireless terminals, each CDMA carrier that is transported from the satellite gateway to the satellite may consume 1.25 MHz of feeder link spectrum. Assuming that traffic is such that only one carrier per cell is used, then 400×1.25 MHz or 500 MHz of forward feeder link bandwidth may be used. Moreover, if certain cells use more than one carrier and/or a Wideband CDMA (W-CDMA) air interface standard is used, the feeder link bandwidth may increase further.

U.S. Pat. No. 6,317,583 to Wolcott et al. describes a telecommunications satellite channelizer for mapping radio frequency (RF) signals between feeder links and mobile link beams based on a predefined frequency plan. The mobile link beams define a coverage area of a satellite. Each feeder link and mobile link beam comprises a plurality of feeder subbands and mobile subbands are grouped to form feeder link channels and mobile link channels. The channelizer includes at least one feeder lead carrying a feeder link signal associated with a ground station. A feeder link distribution network is connected to the feeder leads and maps RF signals in the feeder links onto a plurality of distribution leads as divided feeder signals. Channel multiplexers are connected to the distribution leads. Each channel multiplexer includes a set of band pass filters, each of which passes RF signals in a subset of feeder subbands corresponding to a single feeder channel in order to map a mobile link channel and a feeder link channel onto one another based on a predefined frequency plan. The channelizer groups or multiplexes signals from a plurality of feeders into each beam. Fixed local oscillator up converters shift each composite mobile channel to a common band allocated to all beams. The frequency plan is defined such that beam handovers and ground station handovers may be performed without a need for at least one of switching, retuning and resynchronization of the telecommunications satellite and the mobile terminal. See the Wolcott et al, Abstract.

SUMMARY OF THE INVENTION

Some embodiments of the present invention nonidentically map information content between a plurality of service link carriers and a plurality of feeder link carriers at a cellular satellite. A reduced number of satellite feeder link carriers compared to the number of satellite service link carriers and/or a reduced total bandwidth of the satellite feeder link carriers compared to the satellite service link carriers thereby may be obtained.

More specifically, some embodiments of the present invention pack information from a plurality of return service link carriers into a return feeder link carrier at a cellular satellite. In other embodiments, information also is unpacked from a forward feeder link carrier into a plurality of forward service link carriers at the cellular satellite. In some embodiments, information from the plurality of return service link carriers is packed into fewer return feeder link carriers and/or information from at least one forward feeder link carrier is unpacked into more forward service link carriers, at the cellular satellite. In still other embodiments, information from the plurality of return service link carriers having a total aggregate return service link bandwidth is packed into one or more return feeder link carriers having a total return feeder link bandwidth that is less than the total aggregate return service link bandwidth and/or information from one or more forward feeder link carriers having a total forward link bandwidth is unpacked into the plurality of forward service link carriers having a total aggregate forward service link bandwidth that is greater than the total forward feeder link bandwidth, at the cellular satellite. In still other embodiments, information from the plurality of return service link carriers is packed at the cellular satellite to fill at least one return feeder link carrier and/or information from at least one forward feeder link carrier that is filled is unpacked at the cellular satellite into more forward service link carriers.

Embodiments of the invention may be used with TDMA, CDMA and/or other air interfaces. When TDMA air interfaces are used, slots in TDMA frames of a return feeder link carrier are loaded with TDMA frames of the return service link carriers that may not be fully loaded. This loading may take place by demodulating the return service link carriers, performing the slot loading and then modulating the return feeder link carriers at the satellite. Alternatively, the satellite may use slot-level synchronization without resorting to demodulation to extract the information-carrying return service link TDMA slots and use them to load and pack the return feeder link frames.

In other embodiments, slots in TDMA frames of a forward feeder link carrier are selectively routed to TDMA frames of selected ones of the forward service link carriers. This routing may take place by demodulating a forward feeder link carrier, performing the selective routing and modulating the forward service link carriers. Alternatively, the satellite may use slot-level synchronization (without resorting to demodulation) to extract the information-carrying forward feeder link TDMA slots and route them selectively to load the TDMA frames of the forward service link carriers.

In still other embodiments, TDMA frames of a forward feeder link carrier are selectively replicated at the satellite to TDMA frames of selected ones of the forward service link carriers. In yet other embodiments, power in selective ones of the slots of the replicated TDMA frames of the selected ones of the forward service link carriers is reduced (or brought to zero), so that power may be conserved for the replicated TDMA slots that are not needed in a particular forward service link.

In CDMA embodiments, direct sequence spread return service link carriers that are not fully loaded are combined into one return feeder link carrier. As part of the combining, in some embodiments, the return service link carriers are demodulated, the combining is performed and the return feeder link carriers are then modulated at the satellite. In some embodiments, demodulation of the direct sequence spread return service link carriers may not be performed. Instead, shifting a plurality of underloaded return service links to a common frequency and superimposing, with or without time alignment, may be used to form a highly packed return feeder link carrier which, after frequency translation to the return feeder band, may be transmitted to the cellular satellite gateway(s).

In other embodiments, direct sequence spread information from a forward feeder link carrier is selectively routed to selected ones of the forward service link carriers. In some embodiments, the forward feeder link carrier may be demodulated prior to the routing and the forward service link carriers may be modulated after the routing. In still other embodiments, direct sequence spread information from a forward feeder link carrier is selectively replicated to selected ones of the forward service link carriers. In these embodiments, power in selected direct sequence spread information of the selected ones of the replicated forward service links may be reduced (and in some embodiments reduced to zero), to conserve power. Accordingly, an identical mapping of the feeder link carriers to the service link carriers, and vice versa, need not be provided, so that a reduced feeder link bandwidth and/or number of carriers may be used.

DETAILED DESCRIPTION

Figure 1:
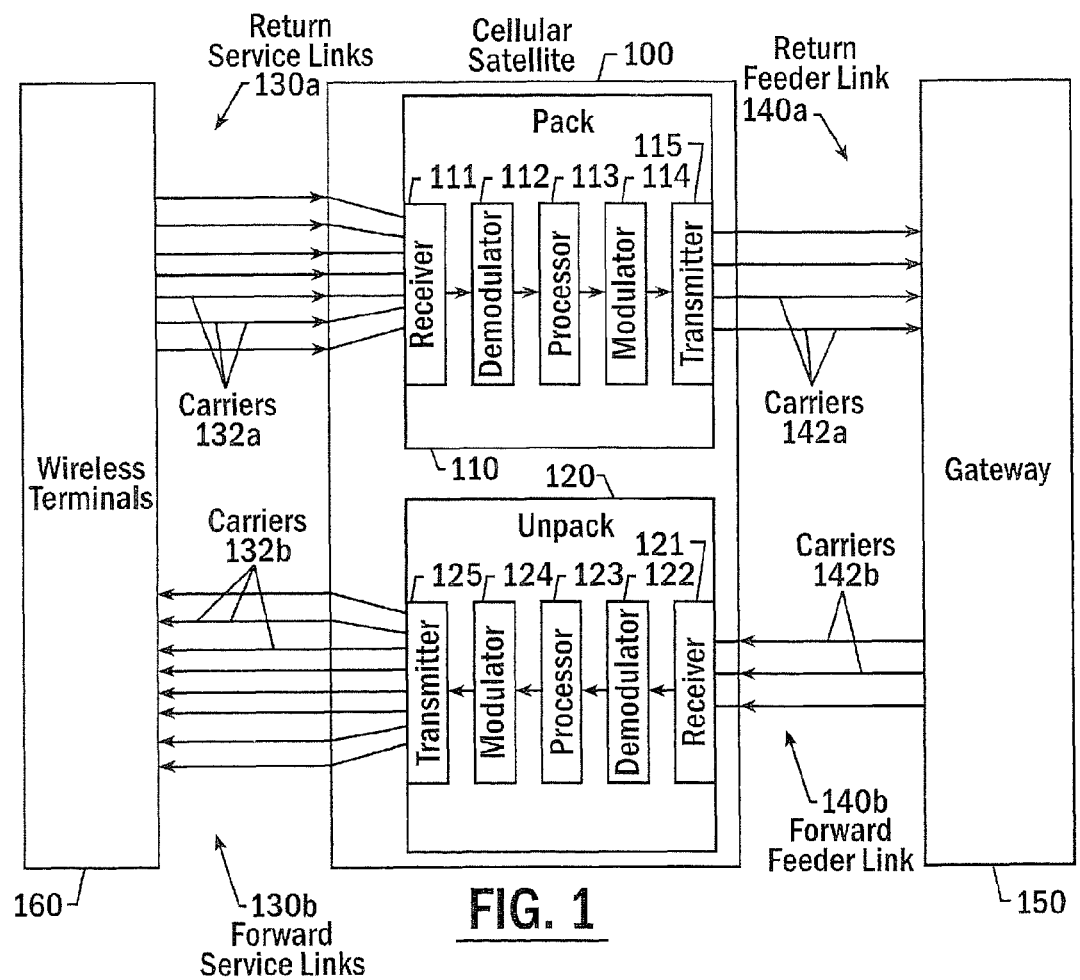
FIGS. 1 and 2 are block diagrams of cellular satellite radiotelephone systems and methods according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Some embodiments of the present invention may arise from a recognition that an identical (i.e., one-to-one) mapping of the feeder link carriers to the service link carriers (and vice versa) need not be provided. Rather, a nonidentical (i.e., not a one-to-one) mapping of information content between the service link carriers and the feeder link carriers (and vice versa) may be provided. Thus, the information that is transmitted between the satellite and the gateway via the feeder link(s) may be packed to fill the feeder link carriers, so as to reduce or minimize the number of feeder link carriers and/or the bandwidth that is used by the feeder link(s). The information may be split or unpacked at the satellite, to provide the desired satellite downlink spot beams with the desired information, and also may be packed at the satellite, to allow the satellite uplink spot beams and the information contained therein to be packed into a reduced number of carriers and/or a reduced bandwidth on the feeder link(s).

Figure 2:
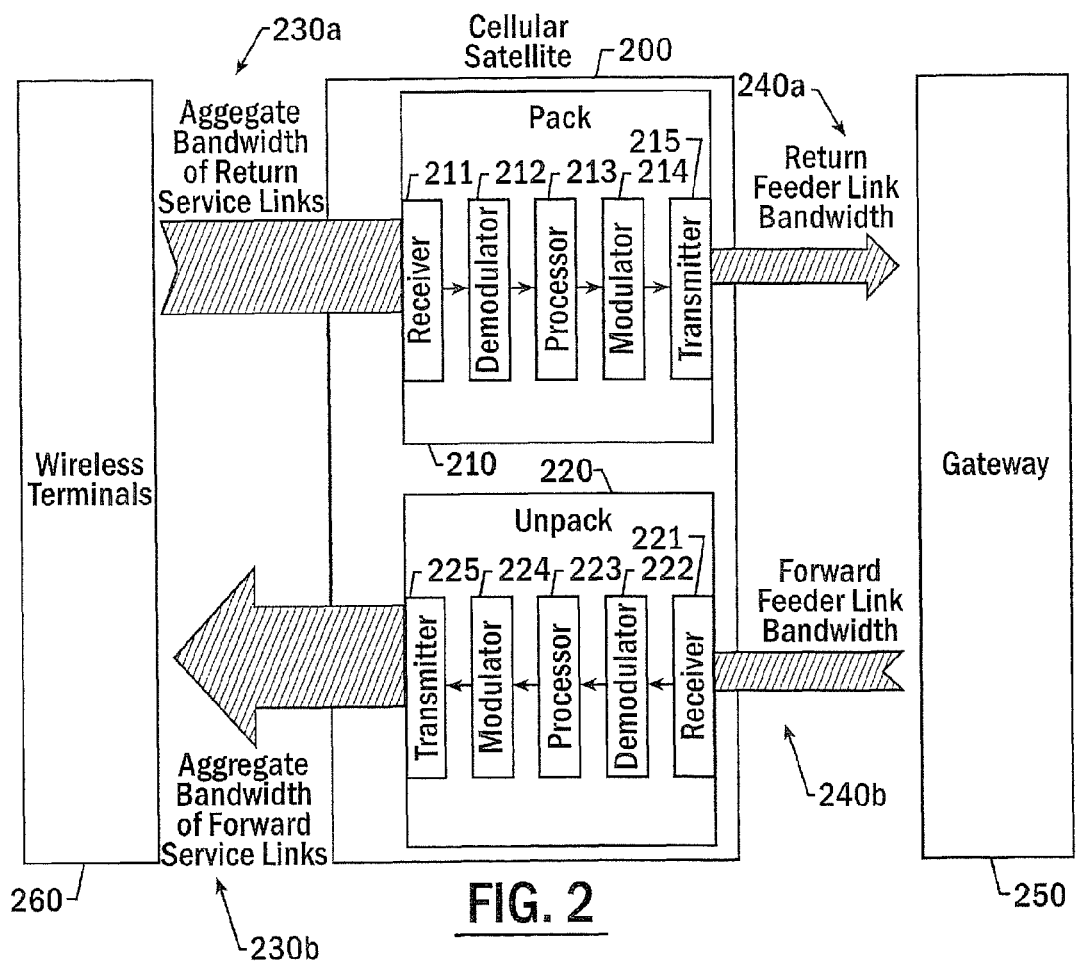

FIGS. 1 and 2 are block diagrams of cellular satellite radiotelephone systems and methods according to some embodiments of the present invention. More specifically, FIG. 1 illustrates a reduction in the number of feeder link carriers and FIG. 2 illustrates a reduction in the aggregate bandwidth of the feeder link(s) according to some embodiments of the present invention.

FIG. 1 illustrates packing 110 at a cellular satellite 100, information from a plurality of return service link carriers 132a of a plurality of return service links 130a, here shown as seven return service link carriers 132a, which originate from wireless terminals 160, into at least one return feeder link 140a comprising at least one return feeder link carrier 142a, here four return feeder link carriers 142a, which are provided to one or more gateways 150, according to some embodiments of the present invention. FIG. 1 also illustrates unpacking 120 at the cellular satellite 100 information from at least one forward feeder link 140b, comprising at least one forward feeder link carrier 142b, here three forward feeder link carriers 142b, which originate from gateway(s) 150, into a plurality of forward service link carriers 132b of a plurality of forward service links 130b, here eight forward service link carriers 132b, which are provided to wireless terminals 160. Accordingly, as shown in FIG. 1, fewer return feeder link carriers 142a then return service link carriers 132a are used, and fewer forward feeder link carriers 142b than forward service link carriers 132b are used. Thus, fewer feeder link carriers may be used. It will be understood that the number of forward/return links and carriers shown in FIGS. 1-4 are exemplary and are non-limiting. Moreover, equal numbers of forward and return feeder link carriers and equal numbers of forward and return service link carriers may be provided.

As will described in detail below, packing 110 may be provided by a first receiver 111, a first demodulator 112, a first processor 113, a first modulator 114 and a first transmitter 115 in some embodiments. Unpacking 120 may be provided by a second receiver 121, a second demodulator 122, a second processor 123, a second modulator 124, and a second transmitter 125 in some embodiments. It also will be understood that elements 111-115 and 121-125 are illustrated separately for functional purposes, but some or all of the functions thereof may be combined in some embodiments of the present invention.

FIG. 2 illustrates other embodiments of the present invention, where packing 210 of information is performed from a plurality of return service link carriers that originate from wireless terminals 260 into a return feeder link carrier that is provided to gateway 250, wherein the total return feeder link bandwidth 240a is less than the total return service link bandwidth 230a, as indicated by the thickness of the return feeder link bandwidth 240a relative to the thickness of the aggregate return service link bandwidth 230a. FIG. 2 also illustrates unpacking 220 at the cellular satellite 200, information from a forward feeder link carrier that is provided by the gateway 250, into a plurality of forward service link carriers which interface with wireless terminals 260, wherein the total forward feeder link bandwidth 240b is less than the total aggregate forward service link bandwidth 230b, as indicated by the relative thickness of the forward feeder link bandwidth 240b and the aggregate forward service link bandwidth 230b of FIG. 2.

As will be described in detail below, packing 210 may be provided by a first receiver 211, a first demodulator 212, a first processor 213, a first modulator 214 and a first transmitter 215 in some embodiments. Unpacking 220 may be provided by a second receiver 221, a second demodulator 222, a second processor 223, a second modulator 224, and a second transmitter 225 in some embodiments. It also will be understood that elements 211-215 and 221-225 are illustrated separately for functional purposes, but some or all of the functions thereof may be combined in some embodiments of the present invention.

Conventionally, feeder link carriers are mapped onto satellite cells upon arrival at the satellite, unaltered and/or without further processing that may entail replication and/or adding or deleting information content. Because processing may not be provided at the satellite, even though each carrier can support up to L users simultaneously, where L is greater than 1, the feeder link bandwidth and/or the number of carriers conventionally remains the same whether only one active user per satellite cell or up to L active users per satellite cell are present. Thus, in the example that was described above, 500 MHz bandwidth and 400 carriers may be used conventionally on the feeder link even though one or more of the satellite cells are operating with less than their maximum number of users.

In sharp contrast, some embodiments of the invention can pack 110, 210 the information from a plurality of return service link carriers 132a into a return feeder link 140a that has a reduced number of carriers 142a compared to the sum of the carriers 132a in the return service links 130a, and/or reduced bandwidth 240a compared to the sum of the bandwidths 230a of all the return links, and can unpack 120, 220 a forward feeder link 140b to provide the desired satellite forward service links 130b.

Figure 3:
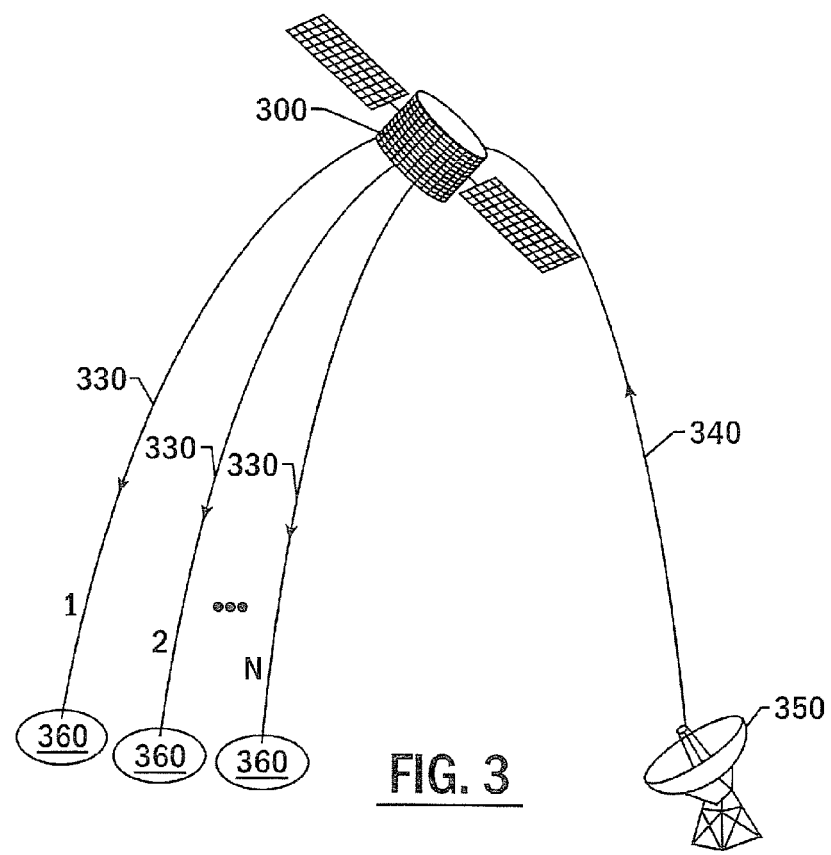
FIGS. 3 and 4 are schematic diagrams of cellular satellite radiotelephone systems and methods according to some embodiments of the present invention.

FIG. 3 is a schematic diagram of cellular satellite systems and methods according to some embodiments of the present invention. FIG. 3 illustrates a forward feeder link 340 from a satellite gateway 350 to a satellite 300, and the corresponding forward service links (downlinks) 330 from the satellite to multiple satellite cells 360. However, it will be understood that similar approaches may be used for the satellite return service links (uplinks) from wireless terminals in the satellite cells 360 to the satellite 300 and the corresponding return feeder link(s) from the satellite 300 to the satellite gateway(s) 350.

Embodiments of FIG. 3 illustrate use of a CDMA air interface, and more specifically illustrate CDMA carrier splitting on-board the satellite 300 to reduce or minimize feeder link bandwidth. Referring now to FIG. 3, assume that there are $\lambda$ active users, where $\lambda$ㆍ$L$, distributed over N satellite cells 360. According to some embodiments of the present invention, since one carrier can serve up to L users, one carrier, in principle, can suffice to serve the N cells 360 relative to the λ users. Thus, according to some embodiments of the present invention, a single carrier may be used on the feeder link 340 rather than N carriers. The number of feeder link carriers and/or the feeder link bandwidth thereby may be less than the number of forward service link carriers and/or aggregate forward service link bandwidth by a factor of N, in this example.

Continuing with the above example, a single carrier serving all the λ users may be provided to the satellite 300 from the gateway 350 via the forward feeder link 340. However, since the users are distributed over N different satellite cells 360, some embodiments of the present invention may replicate the single carrier N times at the satellite, as illustrated in FIG. 3, and then distribute this carrier over each one of the N cells 360. Thus, these embodiments may reduce the number of feeder link carriers and/or bandwidth by a factor of N, but may increase the radiated service link power, since more spreading codes than actually used in a particular cell may be transmitted to a particular cell.

Other embodiments of the invention, as also illustrated in FIG. 3, may reduce or eliminate the potential increase in power in the service links 330 between the wireless terminals and the satellite 300, by demodulating the feeder link carrier 340 at the satellite 300, with or without data regeneration, before the forward service link carrier is transmitted over the N cells. Demodulation can be used to separate or split the λ distinct direct sequence spread information of the carrier, corresponding to the λ users. Once separated, the information may be recombined as desired, and modulated to form appropriate carriers before transmitting over the N downlinks 330 to the wireless terminals. Additional radiated power overhead, therefore, may not be required.

Thus, in some embodiments of the present invention, the communications between a plurality of wireless terminals and a satellite may be packed into a smaller number of carriers and/or less bandwidth on the feeder link between the satellite and the satellite gateway. The packed carrier(s) may be replicated for communication with the satellite cells and/or may be unpacked at the satellite without replication, so that only those communications that are used in a given cell will be transmitted on the forward service links between the wireless terminals and the satellite. Feeder link bandwidth thereby can be reduced or minimized. Moreover, feeder link carrier unpacking at the satellite may be used to reduce or minimize the power on the service links between the satellite and the wireless terminals. Power also may be reduced, or brought to zero, for replicated spreading coded information that is not needed by users of a particular service link.

Figure 4:
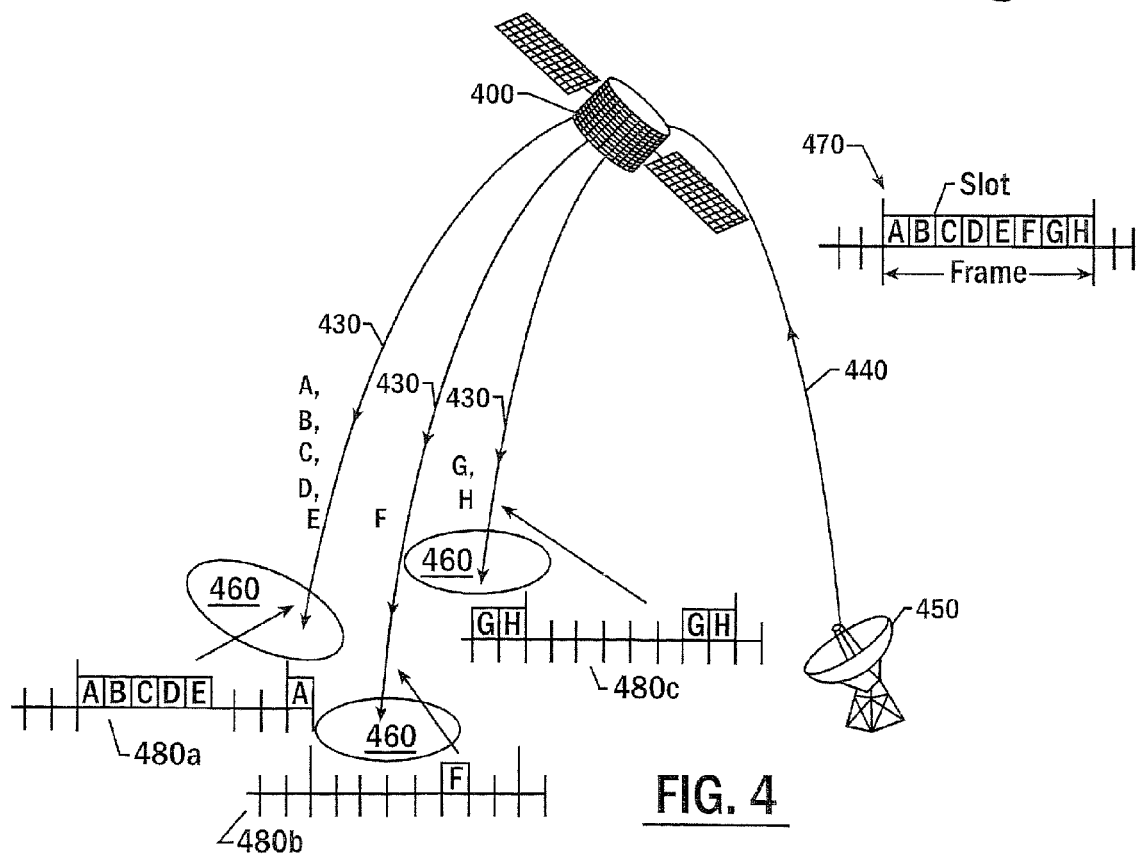

Referring now to FIG. 4, other embodiments of the invention may be used with TDMA air interfaces. FIG. 4 illustrates a forward feeder link 440 and a plurality of forward service links 430. However, similar approaches may be used for the return service links and the return feeder link(s). In FIG. 4, a TDMA air interface is used for the service links, with an 8-slot (burst) frame structure. It will be understood that other TDMA frame structures may be used.

Referring again to FIG. 4, each TDMA carrier may serve up to eight different users, labeled A-H. These users may be in different satellite cells 460, however. As illustrated in FIG. 4, in one example, users A, B, C, D and E may be within one satellite cell. User F may be in another satellite cell and users G and H may be in yet another satellite cell.

Conventionally, users A-H may be served by three different feeder link carriers, represented by 480a, 480b and 480c, that are not fully loaded. Conventionally, these three different feeder link carriers are sent to the satellite from the gateway via the feeder link(s) 440.

In contrast, according to some embodiments of the present invention, one fully loaded feeder link carrier 470 may be sent to the satellite 400 by the satellite gateway 450, to serve all eight users. As shown in FIG. 4 at 470, the single, fully loaded carrier on the feeder link 440 may contain eight slots A-H.

In some embodiments, the fully loaded feeder link carrier 470 may be transmitted to each of the three satellite cells 460 shown in FIG. 4. This can reduce the amount of processing that may be performed on the satellite 400, at the potential expense of increased service link power, because additional TDMA slots may be transmitted in each cell 460 that are not used by a user in that cell 460. Thus, in some embodiments, the entire feeder link carrier 470 may be replicated at the satellite 400, and the entire frame of carrier 470 may be sent to all cells 460 containing users associated with the carrier, at the potential expense of unnecessarily increasing the radiated service link power.

In other embodiments, the fully loaded feeder link carrier 470 may be transmitted to each of the three satellite cells 460 shown in FIG. 4, as was described above. However, in these embodiments, reduced power or no power may be allocated to one or more or all of the slots in each cell 460 that are not used by a wireless terminal in that cell. Thus, in these embodiments, the entire feeder link carrier 440 may be replicated at the satellite 400 and the entire frame of carrier 470 may be sent to all cells containing users associated with the carrier, but the power in one or more or all of the slots that are not used may be reduced to a lower value or reduced to zero. Accordingly, some processing may be used to determine the power level of a given slot, but the increase in radiated service link power can be reduced or eliminated compared to embodiments that were described above. A trade-off between the radiated service link power and the processing that is used at the satellite 400 thereby may be provided.

In still other embodiments, the fully loaded feeder link carrier 470 may have its slots or bursts separated and routed over different cells 460, as desired, to serve multiple users over different satellite cells. Thus, a slot router may be provided to route slots A, B, C, D and E to a first cell as shown at 480a, burst F to a second cell as shown at 480b and bursts G and H to a third cell as shown at 480c. Accordingly, these embodiments can reduce or minimize feeder link bandwidth and/or carriers without the need to increase the radiated service link power. Additional processing may be provided at the satellite 400, however.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A cellular satellite communications method comprising:
packing at a cellular satellite, information from a plurality of return service link carriers into a return feeder link carrier so that the return feeder link carrier comprises a level of information that is greater than a level of information associated with any one individual return service link carrier of the plurality of return service link carriers and so that a bandwidth associated with the return feeder link carrier is substantially the same as a bandwidth that is associated with any one individual return service link carrier of the plurality of return service link carriers.

2. A cellular satellite communications method according to claim 1 further comprising:
unpacking at the cellular satellite, information from a forward feeder link carrier into a plurality of forward service link carriers so that a level of information associated with any one individual forward service link carrier of the plurality of forward service link carriers is less than the information that is unpacked from the forward feeder link carrier.

3. A cellular satellite communications method comprising:

unpacking at a cellular satellite, information from a forward feeder link carrier into a plurality of forward service link carriers so that a level of information associated with any one individual forward service link carrier of the plurality of forward service link carriers is less than the information that is unpacked from the forward feeder link carrier and so that a bandwidth associated with the forward feeder link carrier is substantially the same as a bandwidth that is associated with any one individual forward service link carrier of the plurality of forward service link carriers.

4. A space segment for a cellular satellite communications system comprising:

a satellite that is configured to pack information from a plurality of return service link carriers into a return feeder link carrier so that the return feeder link carrier comprises a level of information that is greater than a level of information associated with any one individual return service link carrier of the plurality of return service link carriers and so that a bandwidth associated with the return feeder link carrier is substantially the same as a bandwidth that is associated with any one individual return service link carrier of the plurality of return service link carriers.

5. A space segment according to claim 4 wherein the satellite is further configured to unpack information from a forward feeder link carrier into a plurality of forward service link carriers so that a level of information associated with any one individual forward service link carrier of the plurality of forward service link carriers is less than the information that is unpacked from the forward feeder link carrier.

6. A space segment for a cellular satellite communications system comprising:

a satellite that is configured to unpack information from a forward feeder link carrier into a plurality of forward service link carriers so that a level of information associated with any one individual forward service link carrier of the plurality of forward service link carriers is less than the information that is unpacked from the forward feeder link carrier and so that a bandwidth associated with the forward feeder link carrier is substantially the same as a bandwidth that is associated with any one individual forward service link carrier of the plurality of forward service link carriers.

* * * * *